Patented Jan. 11, 1949

2,458,495

UNITED STATES PATENT OFFICE 2,458,495

PROCESSES OF FERMENTATION

Jackson Walter Foster, Austin, Tex., assignor to Merck & Co., Inc., Rahway, N. J., a corporation of New Jersey No Drawing. Application July 2, 1948, Serial No. 36,822

10 Claims. (Cl. 195—36)

This invention relates to processes of fermentation for the production of penicillin. More particularly, it relates to the production of penicillin by means of a mutant fungus which was previously unknown and is referred to hereafter either as Penicillium chrysogenum var. brevisterigma or as the new variety.

The mycological aspects of a number of types of several species of several genera of fungi possessing some limited penicillin-producing capacity have been described. That capacity of some of them has been somewhat improved through the effects of such mutation agents as X-rays and ultra-violet light, but usually such mutated fungi have not excelled, and often have been inferior to, their parents as producers of penicillin. The greatest quantity of penicillin previously known to be produced by a penicillin-producing organism, namely, by the mutant known as Penicillium chrysogenum Q-176, has been about 1300 international units per ml. of fermented broth in laboratory shake-flask tests. The discovery and the practical application of reliable and highly productive fungal types are therefore essential to the successful manufacture of penicillin by fermentation on an industrial scale.

The applicant has found and applied means of greatly increasing the production of penicillin. Thus, in accordance with his invention, yields of penicillin are obtainable on the order of 3,000 units per ml. of fermented broth.

An object of the present invention is to provide fermentation processes utilizing the said new variety as the agent in the production of enhanced yields of penicillin by submerged aerated fermentation.

This object and other objects will be apparent and a fuller understanding of this invention will be had by reference to the following description and claims.

PARENTAGE OF THE NEW VARIETY

The new variety, Penicillium chrysogenum var. brevisterigma, is a mutant. It was produced by the applicant by the action of ultra-violet light on the conidia of a known mutant of Penicillium chrysogenum which the published literature designated as the ultra-violet mutant Penicillium crysogenum Q-176, which will be referred to hereinafter as the parent and is available from the American Type Culture Collection in Washington, D. C., and from other type collections.

For irradiation, conidia, which had been developed on a colony of Penicillium chrysogenum Q-176 grown on peptone-glucose agar, were suspended in sterile water and were then treated with ultra-violet light from a Westinghouse sterile lamp type SB-WL782 having a maximum intensity at 2537 angstrom units; the distance of these conidia from the radiation source was eight inches; the duration of the exposure to this light was one hour; and the temperature throughout this exposure was 25° C.

The applicant discovered the new variety among the plants grown by him from the so-irradiated conidia, asexually reproduced it freely, and determined that it is clearly distinguishable from the previously known members of the Penicillium chrysogenum species in morphological characteristics, cultural characteristics, and physiological characteristics including its persistent capacity to produce enhanced yields of penicillin in any of many different media.

Thus, the new variety of fungus employed in these processes is the result of definite efforts in procedures of mutation, asexual propagations, and progeny tests to produce and develop a distinct and new fungus having certain desirable characters and qualities which will further appear herein.

The mycological relationship of the new variety and the commonly known fungus, Penicillium chrysogenum Thom's No. 26 ("The Penicillia," Charles Thom, Williams and Wilkins Co., Baltimore, Md., 1930, page 261), and the other types of this species concerned in this text, is indicated in the following table:

TABLE 1

Species Thom's No. 26

↓

Penicillium chrysogenum isolated from cantaloupe, July, 1943, and known as Penicillium chrysogenum NRRL 1951

↓

Penicillium chrysogenum NRRL 1951-B, which developed in colony of Penicillium chrysogenum NRRL 1951 under natural conditions

↓

Penicillium chrysogenum NRRL 1951-B25, herein referred to eithe as such or as great-grandparent, which arose in nature as a modi fication of Penicillium chrysogenum NRRL 1951-B

↓

Penicillium chrysogenum X-1612, induced by X-ray irradiation of conidia of Penicillium chrysogenum NRRL 1951-B25

↓

Penicillium chrysogenum Q-176, herein referred to either as such o as parent, induced by ultra-violet irradiation of conidia of Peni cillium chrysogenum X-1612

↓

Mutant fungus, herein referred to as the new variety, induced by ultra-violet irradiation of conidia of Penicillium chrysogenum Q-176.

Some of the dissimilarities occurring among the fungi enumerated in the foregoing table are:

*Penicillium chrysogenum* NRRL 1951 forms a looser-textured colony, and is more robust, than Thom's No. 26, and produces larger penicilli with narrower metulae and narrower sterigmata than those produced by Thom's No. 26. Both fungi differ from the other fungi herein enumerated in having, like almost all the members of the *Penicillium chrysogenum* species, consistently typical balanced proportionate branches, metulae and sterigmata in their penicilli. *Penicillium chrysogenum* NRRL 1951-B25, *Penicillium chrysogenum* X-1612, and *Penicillium chrysogenum* Q-176 usually produce atypical or irregular penicilli. The new variety has penicilli which are always atypical or irregular in pattern.

*Penicillium chrysogenum* NRRL 1951-B and *Penicillium chrysogenum* NRRL 1951-B25 are substantially alike in morphological details and cultural aspects. *Penicillium chrysogenum* X-1612 closely resembles *Penicillium chrysogenum* NRRL1951-B25 morphologically, and is regarded as being appreciably different therefrom only in biochemical peculiarities. *Penicillium chrysogenum* Q-176 closely resembles both *Penicillium chrysogenum* NRRL 1951-B25 and *Penicillium chrysogenum* X-1612 morphologically, although presenting some differences in colony-pattern.

The average sterigmata length of Thom's No. 26, *Penicillium chrysogenum* NRRL 1951 and *Penicillium chrysogenum* NRRL 1951-B25 is 8.5, 9, and 8.2 microns, respectively. *Penicillium chrysogenum* Q-176 has a sterigmata length which averages 6.9 microns, and the shape of its sterigma is approximately cylindrical, resembling the shape of the sterigma of *Penicillium chrysogenum* NRRL 1951-B25. In contradistinction, the new variety has clavate to obovoid sterigmata which average only 5.9 microns in length and are sometimes as short as 4.2 microns.

These dissimilarities, and other differences described in this application, readily distinguish the new variety from all previously known members of the *Penicillium chrysogenum* species.

The sterigmata in Penicillia are the specialized conidia-producing cells or organs, and they are typically tubular or cylindrical, and are typically narrowed or tapered toward their apices to form conidia-yielding tubes.

The dwarfed state and the peculiar clavate to obovoid shape of the sterigmata of the new variety are well-marked, permanent, and novel morphological characteristics distinguishing the new variety from other types of this species.

DESCRIPTION OF *PENICILLIUM CHRYSOGENUM* VAR. *BREVISTERIGMA*

I. MORPHOLOGICAL CHARACTERISTICS

*Form and Growth.*—On Czapek's solution agar, robust grower, producing abundant mat or mycelium of vegetative hyphae with aerial fertile hyphae (conidiophores) arising therefrom as branches bearing conidial apparatus in form of atypical penicilli containing atypical sterigmata.

*Mycelium.*—Complex network of vegetative hyphae, providing abundant massed fungal body largely subsurface in habit and bearing branches of conidiophores.

*Vegetative hyphae.*—Developing freely, at about 24° C., either from cuttings of vegetative hyphae transplanted in nutrient strata or from conidia (asexual spores) seeded therein; filamentous, smooth, thin-walled, septate, branching, forming largely subsurface network and also network at the surface of colonies, and giving rise to fertile branches (conidiophores); subsurface hyphae at first colorless, gradually becoming brightly colored from metabolic products.

*Conidiophores.*—Arising as aerial fertile branches (fruiting stalks) mostly from submerged hyphae and partly from surface hyphae; unbranched except sometimes by metulae at apex; smooth-walled; dwarfish, about 33 to 60 microns long, averaging about 41 microns, and about 3.5 to 4 microns in diameter.

*Penicillus.*—Conidial apparatus (fruiting structure) arising at tip of conidiophore; not typical of species, being very irregular in contour and presenting a much-modified brush-like aspect; penicillus often consisting of single cluster of conidia-producing organs (sterigmata) directly borne at tip of conidiophore, but sometimes also containing metulae (secondary or accessory fruiting branches) arising at tip of conidiophore, said metulae varying greatly in length and form and then supporting sterigmata.

*Sterigmata.*—Arising either at apex of conidiophore or at apex of metula; sometimes arranged in clusters of 3 to 8 but seldom more than 3; atypical in size and form, being dwarf, clavate to obovoid, not narrowed at tip to form a tube; ranging from 4.2 to 7.4 by 3.4 microns; each sterigma producing single unbranched relatively short chain of conidia; chains not arranged in columns; 3 to 12 conidia per mature chain.

*Conidia.*—Conidia within chain often dumbbell shape indicating incomplete separation; after abstriction, oval or subglobose, 4.1 by 3.3 microns, seldom conspicuously elliptical; smooth; no markings; color as in main conideal areas of colonies.

II. CULTURAL CHARACTERISTICS

Colonies

In subsurface cultivation, the habitats favorable to the new variety for vigorous and prolific growth into colonies and for ample sporulation are afforded by seeding-beds or strata containing carbohydrate, nitrogenous and mineral nutrients, with moisture, moderate air supply, and a temperature about 24° to 30° C. A number of useful strata are given below in illustration but not in limitation:

Czapek's solution agar, containing:

| | | |
|---|---|---|
| Sucrose | grams | 30.0 |
| Sodium nitrate (NaNO₃) | do | 3.0 |
| Dibasic potassium phosphate (K₂HPO₄) | do | 1.0 |
| Magnesium sulfate (MgSO₄.7H₂O) | do | 0.5 |
| Potassium chloride (KCl) | do | 0.5 |
| Ferrous sulfate (FeSO₄.7H₂O) | do | 0.01 |
| Agar | do | 15.0 |
| Water | cc | 1,000 |

Modified Sabaraud's dextrose agar, containing:

| | | |
|---|---|---|
| Peptone | grams | 8.0 |
| Dextrose | do | 38.0 |
| Malt extract | do | 2.0 |
| Agar | do | 20.0 |
| Distilled water | cc | 1,000 |

(Autoclaved at 15 lb. pressure for 20 minutes.)

Peptone-glucose agar, containing:

| | | |
|---|---|---|
| Glucose | grams | 20.0 |
| Peptone | do | 10.0 |
| Magnesium sulfate (MgSO₄.7H₂O) | do | 0.25 |
| Monobasic potassium phosphate (KH₂PO₄) | do | 0.25 |
| Agar | do | 20.0 |
| Water | cc | 1,000 |

Potato-dextrose agar, containing:

Potato (cooked with water for ½ hour in autoclave and next ground in Waring blender) _____ grams__ 100.0
Dextrose _____ do____ 10.0
Water to _____ cc__ 1,000

The following characteristics are observed in the growth-habits, the colony-patterns, the colorations and other features of the below-identified colonies of fungi grown for the stated periods at about 24° C. upon the strata stated below:

tains radiating furrows, is a characteristic that is not present in the new variety.

The floccose-tending, medium-sporulating state, which extends practically throughout the great-grandparent colony, is in marked contrast to the more compact heavily-sporulating state of the parent colony, on the one hand, and to the light-sporing state of the colony of the new variety, on the other hand.

The relatively great depth of the colony of the new variety also distinguishes this fungus in its habit of growth from both great-grandparent and parent.

| Great-Grandparent | Parent | New Variety |
| --- | --- | --- |
| ON CZAPEK'S SOLUTION AGAR, AT THE SEVENTH DAY OF GROWTH | | |
| Colony about 3 cm. in diameter, up to about 300 microns deep in central area; velvety, tending toward floccose, zonate, unevenly cleft and furrowed; conideal area, tangled raised growth, medium-sporing, in pale to deep tones of glaucous-green (Plate 27B5); marginal zone, about 2.5 mm. wide, floccose, mostly white, shaded in parts by touches of glaucous-green; exudate, scanty, light-yellow. | Colony about 2.5 cm. in diameter, up to about 300 microns deep in central area; velvety, widely zonate, irregularly cleft in central area, radiately furrowed to marginal zone; conideal areas, heavy-sporing, fairy green (Plate 20A7), with some parts paler in seacrest (Plate 19A6); marginal zone, well-defined, about 1 mm. wide, velvety, white; exudate, abundant light-yellow droplets. | Colony about 2.5 cm. in diameter, up to 500 microns deep in central area; velvety, almost azonate, with deep convolutions; convoluted regions, almost completely lacking in conidia, ranging from glaucous (Plate 19B3) to yellowish tones of corydalis green (Plate 19B4); main conideal areas, light-sporing, predominantly in tarragon (Plate 21B7); marginal zone, less than 0.5 mm. wide, white; exudate, medium quantity, yellow. |
| ON PEPTONE-GLUCOSE AGAR, AT THE FIFTH DAY OF GROWTH | | |
| Colony about 4 cm. in diameter, up to 300 microns deep in central area; velvety, zonate, interspersed with white non-sporulating tufts of hyphae contributing to variegated appearance; central area, medium-sporing unevenly; outer area, somewhat flattened, radiately furrowed, heavy-sporing unevenly; conideal areas ranging from green-blue (Plate 28H1) to dryad (Plate 28H4), with some splashes of pale pyrethrum yellow (Plate 11L2); marginal zone not clearly defined, floccose, variegated, about 2 mm. wide; exudate, abundant, yellow. | Colony about 3 cm. in diameter, up to 300 microns deep in central area; velvety, zonate; central area, buckled, widely fissured unevenly; outer area, fairly evenly furrowed radiately; few small whitish non-sporulating central streaks; conideal area, very heavy-sporing, in hues of seaspray (Plate 20B6) to fairy green (Plate 20A7), shading in some parts to almond green (Plate 30E6) to Russian green (Plate 30D7); marginal zone, less than 0.5 mm. wide, white; exudate, yellow droplets, mainly on outer area. | Colony about 3 cm. in diameter, nearly 400 microns deep in central area; velvety, zonate, central area, unevenly wrinkled deeply, some irregular regions of olive yellow (Plate 12L2); outer area, somewhat regularly furrowed radiately; light-sporing, predominantly in gooseberry green (Plate 21A8) grape green (Plate 21J1) interspersing in outer area; marginal zone, less than 0.5 mm. wide, white; exudate, medium quantity, yellow. |
| ON PEPTONE-GLUCOSE AGAR, AT THE EIGHTH DAY OF GROWTH | | |
| Colony about 4 cm. in diameter, up to 200 microns deep in central area; velvety, rather loosely felted, zonate, shallow-furrowed radiately; central area, thin-sporing, with some interspersing white tufted regions; outer area, heavy-sporing, conideal areas, in some parts green-blue (Plate 27J5), approaching cabaret (Plate 27I6), and, in large region of colony, somewhat dappled yellowish-green mingling with naiad (Plate 27B7); marginal zone, not clearly defined; exudate, abundant yellow droplets. | Colony about 4 cm. in diameter, up to 300 microns deep in central area; velvety, zonate; central area, deeply wrinkled, variegated in white and linden green (Plate 19J1); outer area, radiately furrowed deeply, heavy-sporing, in green-blue (Plate 26D5), deepening to bouquet green (Plate 27H7) in some regions near outer rim of conideal area; marginal zone about 1 mm. wide, whitish; exudate, abundant yellow droplets. | Colony about 3.5 cm. in diameter, about 400 microns deep in central area; velvety, zonate; central area, with large uneven fissures leaving much-reduced, irregular, sparsely-sporulating surface, in yellow-green between seacrest (Plate 19A6) and pistache (Plate 19C6), intermingled with few small white patches and with irregular regions of meadow green (Plate 30D10); outer area, irregularly furrowed, light-sporing, predominantly in gooseberry green (Plate 21A8); also, in outer area, few patches of citron green (Plate 19K2) and touches of meadow green here and there; marginal zone, about 2 mm. wide, white; exudate, abundant yellow droplets. |

The colors herein designated by plates are those of "A Dictionary of Color," by A. Maerz and M. Rhea Paul, McGraw-Hill Book Company, 1st ed., 1930.

The following further reference is made to the colony each of the great-grandparent (*Penicillium chrysogenum* NRRL 1951–B25), the parent (*Penicillium chrysogenum* Q–176), and the new variety, as they appear on the seventh day of their growth upon Czapek's solution agar at about 24° C.:

The central area of the great-grandparent is less well-defined and much less expansive than the central area in the parent. A clearly defined central zone is not present in the new variety, and, under the stated conditions, characteristic peculiarities of the new variety are that it has deep and irregularly-disposed convolutions, and that it bears comparatively few conidia over most of the surface of its colony.

The well-defined outer area in both the great-grandparent and the parent, each of which con- The marginal zones of these three compared colonies becomes progressively less in the order of the descent (Table 1) of these fungi.

The foregoing descriptions of colonies growing on peptone-glucose agar also afford comparative distinctions.

*Comparative rates of growth*

Numerous observations have revealed considerable differences in the rate of the growth of the great-grandparent, the parent, and the new variety. For instance, when these fungi are separately grown from seedings of their conidia on potato-dextrose agar, the germination of the conidium and the initial growth of the great-grandparent are greatly delayed in comparison with the germination and the initial growth of the parent and the new variety. After 24 hours at 30° C. from the time of sowing, the great-grandparent generally consists of merely singly or doubly branched germination tubes, whereas the parent now shows more extensive hyphal development, and the new variety has already become a much-branched subsurface mycelium.

However, after 48 hours from the time of sowing, the great-grandparent has overtaken its two mutated descendants in maturity and now contains many well-defined conidial chains, each about 8 to 10 conidia in length. The parent is seen to be intermediate in its rate of growth, bearing conidial chains ranging from one to six conidia after 48 hours. The new variety is the least speedy in further growth within 48 hours, as only seldom are more than one or two conidia then found attached to its sterigmata.

Comparative conidia producing capacities

The new variety and the parent are further distinguishable by the marked disparity in their sporulating habits and thus in their conidia producing capacities. In comparative evaluations of these yields of conidia, modified Sabaraud's agar contained in each of a number of tubes was seeded with the conidia of the new variety by streaking them across the agar. Tubes containing the conidia of the parent were likewise prepared. After the growth resulting from these conidia had proceeded for one week, at 28° C., in all cases under comparable conditions, a small quantity (ten milliliters) of a sterile aqueous wash-fluid buffered with phosphate and containing one part of aerosol per ten thousand parts, and having a pH value of 7.0, was added to each tube. Then these tubes were rocked gently to wash free the mature conidia. Only 460,000 viable conidia were so obtained from the growth of the new variety per milliliter of wash-fluid, whereas 3,000,000 viable conidia were so obtained from the growth of the parent. In determinations similarly made on new growths, but after they had proceeded for two weeks, each milliliter of wash-fluid withdrawn from the tubes contained 516,000,000 viable conidia of the new variety, on the one hand, but 2,400,000,000 viable conidia of the parent, on the other hand.

Asexual reproduction

In propagation tests of the new variety by asexual methods, its conidia were grown upon Czapek's agar, modified Sabaraud's agar, and other substrates. They germinated readily, and then developed into abundant vigorous growths and colonies in which the atypical penicilli bore the characteristically dwarfed clavate to obovoid sterigmata and in which all the other described characteristics were present.

In further cultivation for propagation purposes, by cuttings or divisions, tips of vegetative hyphae were taken from the described new variety of fungus and were propagated on the indicated and other strata. These cuttings then developed into healthy growths consistently repeating all phases of the life-history of the new variety, and demonstrated that the novel characteristics of the new variety are perpetuated in its progeny.

The new variety is true to the type described. No reversion to the parent form has been found to result from repeated propagations or from changes in cultivation.

The morphological and cultural characteristics described in the foregoing are typical of the new variety, being those of normal, healthy fungi and colonies grown on favorable substrata under favorable conditions in the vicinity of Rahway, New Jersey. It is understood that some of these characters may fluctuate slightly in different environments or seasons, as is usual in fungal-life.

III. Physiological Characteristics

A. One of the outstanding distinctions of the new variety is in the fact that it possesses a penicillin-producing capacity which is highly superior to that of the best previously known producer, namely, its parent, in submerged aerated fermentations, as will be realized from the following illustration.

Example I

A medium was prepared containing 20 gm. cornsteep liquor solids, 30 gm. lactose, 10 gm. $CaCO_3$, 1 gm. phenylacetylethanolamine, and tap water to make one liter. Portions consisting of 80 ml. of this medium were distributed into 250 ml. cotton-plugged Erlenmeyer flasks, and 0.25 ml. of soybean oil was added per flask. After the sterilization of the medium at 121° C. for 20 minutes, flasks were inoculated with a 2 per cent volume of 48-hour-old vegetative growth of the new variety. Flasks inoculated with a 2 per cent volume of similar growth of the parent were likewise prepared. Aeration was effected by agitating the flask contents on a rotary shaker at 225 R. P. M. at 24° C.

The penicillin content of the fermented broth was determined by the cup assay procedure with *Staphylococcus aureus* as the test organism. Assays were made at daily intervals until a maximum yield was obtained. The following results are the average of values obtained on triplicate fermentations:

TABLE 2

*Penicillin production (units/ml.)*

|  | 5 days | 6 days | 7 days | 8 days |
| --- | --- | --- | --- | --- |
| New variety | 1,235 | 2,400 | 3,050 | 1,670 |
| Parent | 990 | 1,320 | 1,105 | |

B. The capacity of the new variety to effect increased yields of penicillin has been demonstrated in repeated tests to be an inherent and permanent property.

The following table of ratio factors, which represent the penicillin-producing activity of the new variety divided by that of its parent, as demonstrated in separate experiments at weekly intervals, evidences this advantage afforded by the new variety in penicillin production. All fermentations were conducted under conditions similar to those set forth in Example I.

TABLE 3

| Test Number | Ratio $\frac{\text{Activity of New Variety}}{\text{Activity of Parent}}$ |
| --- | --- |
| 1 | 2.40 |
| 2 | 2.37 |
| 3 | 2.30 |
| 4 | 2.14 |

C. A further distinction in the biochemical nature of the new variety and its parent is evidenced by the effects of incubation temperature. In its penicillin-producing capacity the new variety is much more sensitive than its parent to temperature variations. Results of comparative experiments are given in Table 4 below. The conditions for these experiments were the same as those in Example I, except that for one set of the experiments the temperature was advanced from 24° C. and maintained at 29° C. All results were from triplicate flasks. It was found that an increase in the temperature of incubation from 24° to 29° C. reduced the penicillin-producing activity of the parent by about 27.5 per cent, whereas that of the new variety was reduced by about 81 per cent:

TABLE 4

Maximum penicillin production in units/ml.

|  | 24° C. | 29° C. |
|---|---|---|
| New Variety | 2,300 | 440 |
| Parent | 1,075 | 780 |

D. Additional dissimilarities of the new variety and its parent are evidenced by the following table of changes occurring during the fermentation of a lactose-cornsteep water medium, as in Example I:

TABLE 5

(a) Incubated at 24° C.

|  | 0 days | 2 days | 3 days | 4 days | 5 days | 6 days |
|---|---|---|---|---|---|---|
| MYCELIUM (MG./ML.) | | | | | | |
| New Variety | | 22.9 | 25.3 | 24.1 | 24.2 | 27.3 |
| Parent | | 24.2 | 25.8 | 22.3 | 23.2 | 19.3 |
| PENICILLIN (UNITS/ML.) | | | | | | |
| New Variety | | 710 | 1,500 | 2,050 | 2,560 | 1,850 |
| Parent | | 690 | 1,100 | 1,450 | 1,170 | 1,020 |
| EXTRACELLULAR SACCAROGENIC AMYLASE (pH-AMYLASE UNITS/ML.) | | | | | | |
| New Variety | | 74 | 81 | 79 | 86 | 94 |
| Parent | | 54 | 57 | 65 | 76 | 67 |
| UNFERMENTED LACTOSE (MG./ML.) | | | | | | |
| New Variety | 29 | 15 | 11 | 8 | 9 | 4 |
| Parent | 29 | 16 | 9 | 3 | 4 | 3 |
| NITROGEN IN SOLUTION (KJELDAHL-MG./ML.) | | | | | | |
| New Variety | 2.25 | 1.60 | 1.66 | 1.25 | 1.96 | 2.05 |
| Parent | 2.25 | 1.24 | 1.04 | 1.39 | 1.48 | 1.38 |
| OXYGEN DEMAND ($QO_2$) | | | | | | |
| New Variety | | 3.0 | 3.3 | 3.3 | 2.6 | 1.9 |
| Parent | | 3.5 | 2.9 | 2.8 | 2.4 | 2.0 |

(b) Incubated at 30° C.

|  | 0 days | 2 days | 3 days | 4 days | 5 days | 6 days |
|---|---|---|---|---|---|---|
| PENICILLIN (UNITS/ML.) | | | | | | |
| New Variety | | 260 | 240 | 440 | 250 | 165 |
| Parent | | 215 | 560 | 780 | 560 | 250 |
| MYCELIUM (MG./ML.) | | | | | | |
| New Variety | | 31 | 26 | 30 | 31 | 31 |
| Parent | | 26 | 27 | 31 | 32 | 33 |
| OXYGEN DEMAND ($QO_2$) | | | | | | |
| New Variety | | 3.4 | 3.8 | 3.8 | 5.7 | 4.1 |
| Parent | | 4.1 | 2.8 | 2.7 | 3.0 | 1.9 |

($QO_2$ means microliters of oxygen consumed per milligram of mycelium per hour.)

In addition to the marked morphological dissimilarities found between the new variety and its parent, it is to be observed that the data in Table 5 show that these fungi have marked physiological dissimilarities, among which the following may be emphasized:

A smaller assimilation of nitrogenous materials was required per mg. of mycelium developed by the new variety, as compared with the parent. At the 24° C. incubation temperature, 0.24 mg. of nitrogen was removed from solution for each milligram of mycelium developed by the new variety; whereas 0.42 mg. of nitrogen was removed from solution for each milligram of mycelium developed by the parent.

In addition to the production of higher yields of penicillin by the new variety, the latter produced a greater quantity of saccharogenic amylase than the parent. The amylase content of culture liquors from the new variety was 130 per cent of that of the parent, and this larger content was effected by 103 per cent as much mycelium of the new variety.

Still more striking differences in biochemical functioning were evident from a comparison of penicillin production, oxygen demand, and milligrams per ml. of mycelium for cultures of the new variety and of the parent when the incubation temperature was changed from 24° C. to 30° C. These differences are presented in Table 6, in which it is evident that a marked increase in oxygen demand by the new variety at 30° C. was associated with a sharp drop in penicillin production, whereas smaller changes occurred with the parent. Mycelium weights were consistently increased with both the new variety and the parent by the change in temperature.

TABLE 6

|  | Percentage differences in results found at 30° C. from results at 24° C. shown in Table 5 | | | | |
|---|---|---|---|---|---|
|  | 2 days | 3 days | 4 days | 5 days | 6 days |
| Mycelium: | | | | | |
| New Variety | 135 | 104 | 125 | 142 | 115 |
| Parent | 108 | 104 | 141 | 139 | 170 |
| Penicillin: | | | | | |
| New Variety | 37 | 16 | 21 | 10 | 9 |
| Parent | 31 | 51 | 54 | 48 | 25 |
| Oxygen Demand: | | | | | |
| New Variety | 113 | 115 | 115 | 220 | 216 |
| Parent | 117 | 95 | 96 | 125 | 95 |

In the foregoing description the following characteristics are among those which especially distinguish the new variety:

1. The vegetative development of the new variety, immediately following germination, is much more rapid than that of its parent, which, however, reaches conideal maturity sooner.

2. The colony-patterns of the new variety are distinctly unlike those of its parent in detailed and over-all aspects.

3. The central-area depths of the colonies of the new variety are at least one-third greater than those of its parent.

4. The coloration of the colonies is peculiar to the new variety.

5. The new variety has a sparsely-sporulating habit, whereas its parent sporulates heavily.

6. The conidiophores of the new variety have a peculiar disposition to dwarf growth, being about 33 to 60 microns in length.

7. The clavate to obovoid sterigmata average less than 6.0 microns in length, sometimes are only about 4 microns in length, and do not attain 8 microns in length, in the new variety.

8. The oxygen demand of the new variety averages about fifty per cent more than that of its parent at 30° C.

9. The new variety assimilates much less nitrogen than its parent during growth.

10. The new variety is approximately three times more sensitive than its parent to increases in temperature in respect to penicillin-yielding activity.

11. The new variety develops about twenty-six per cent more amylase than its parent.

12. The capacity of the new variety is to produce abundant mycelia having the superior qualities of affording quantities of penicillin much greater than those of any predecessor.

It is therefore to be understood that the scope of this invention extends to the use in fermentation processes of any such fungal organisms as those having the characteristics and properties set forth in the instant description, regardless of differences in minor characteristics.

The new variety, *Penicillium chrysogenum* var. *brevisterigma*, produces enhanced yields of penicillin on a number of media of wide range in composition, as the examples herein illustrate.

*Example II*

A medium was prepared containing 30 gm. lactose, 10 gm. $CaCO_3$, 40 gm. cottonseed meal, 1 gm. phenylacetylethanolamine, and tap water to make one liter. Portions each of 80 ml. of this medium were distributed into 250 ml. cotton-plugged Erlenmeyer flasks, and 0.25 ml. soybean oil was added to each flask. Flasks were autoclaved at 121° C. for 20 minutes, cooled, and inoculated with conidia of the new variety. Flasks containing conidia of the parent were similarly prepared. Flasks were placed on a rotary shaking machine at 24° C. After 48 hours' incubation, 5 ml. of the vegetative culture was transferred to new flasks of medium, and the flasks were incubated in the manner indicated. Results are presented below:

TABLE 7

*Comparative penicillin production by new variety and by parent on a cottonseed meal medium*

| | Maximum penicillin production in fermented broth (Units/ml.) |
|---|---|
| New Variety | 1,680 |
| Parent | 1,215 |

*Example III*

A medium was prepared containing lactose, 25 gm.; glucose, 5 gm.; starch, 5 gm.; glacial acetic acid, 6 gm.; $NH_4NO_3$, 4 gm.; $(NH_4)_2SO_4$, 1 gm.; $KNO_3$, 1 gm.; $Na_2HPO_4$, 1.6 gm.; $K_3PO_4$, 2 gm.; $MgSO_4.7H_2O$, 0.25 gm.; $ZnSO_4.7H_2O$, 0.04 gm.; $CuSO_4.5H_2O$, 0.005 gm.; $FeSO_4.7H_2O$, 0.2 gm.; $K_2Cr_2O_7$, 0.000015 gm.; made up to 1 liter with distilled water, and neutralized to pH 6.7 with KOH. After this medium had been distributed into flasks, soybean oil was added, sterilization was effected in the same manner as in Examples I and II, and the flasks were cooled for inoculation. Five ml. of a vegetative culture of the new variety, prepared on the medium described in Example I, were added to each flask. Flasks were incubated on rotary shakers at 24° C., as in Examples I and II. Results are given below:

TABLE 8

*Penicillin production by new variety on a synthetic medium*

| Incubation | Units of Penicillin per ml. |
|---|---|
| 3 days | 370 |
| 4 days | 430 |
| 5 days | 560 |
| 6 days | 410 |

*Example IV*

A medium was prepared containing 20 gm. cornsteep liquor solids, 30 gm. lactose, 10 gm. $CaCO_3$, and tap water to make one liter. This medium was equally distributed into Erlenmeyer flasks. Contents of one of these flasks were supplemented with 0.2 gm. phenylacetamide per 100 ml. Contents of another flask were supplemented with 0.2 gm. phenylacetylethanolamine per 100 ml. The third flask did not receive such supplementation. Soybean oil was added to all flasks. Resulting media in these three flasks were sterilized, inoculated with the new variety, and incubated and aerated in the manner described in Example I. Three flasks receiving the parent were likewise prepared and treated.

Assays were determined as described in Example I. In all these three media the new variety was superior to the parent in penicillin-producing capacity. Results are summarized below.

TABLE 9

*Maximum penicillin production in fermented broth (units/ml.)*

| | Unsupplemented medium | Supplemented media | |
|---|---|---|---|
| | | Phenylacetamide | Phenylacetylethanolamine |
| New Variety | 1,100 | 1,765 | 1,785 |
| Parent | 615 | 1,480 | 1,000 |

*Example V*

A medium was prepared containing 20 gm. cornsteep liquor solids, 30 gm. sucrose, 10 gm. $CaCO_3$, 1 gm. phenylacetylethanolamine, and tap water to make one liter. This medium was equally distributed into flasks, and soybean oil was added. Contents of flasks were sterilized, and were inoculated with a 3 per cent 48-hour-old vegetative growth of the new variety. Incubation and aeration were conducted in the manner described in Example I. Fermentations with the parent were likewise completed.

The following table indicates that the new variety proved to be distinctly superior to the parent in penicillin productivity on the sucrose medium:

TABLE 10

| | Maximum Penicillin Production in Fermented Broth (Units/ml.) |
|---|---|
| New Variety | 1,630 |
| Parent | 570 |

*Example VI*

Vegetative inoculum was developed for a large-scale verification of the productivity of the new variety by transfering conidia of the latter from a stock culture, preserved in soil, to an agar slant, and thence, for the abundant production of conidia, to a 2-liter flask containing 500 ml. of medium comprising brown sugar, 20 gm.; $CaCl_2$, 25 gm.; $NaNO_3$, 6 gm.; $KH_2PO_4$, 1.5 gm.; $MgSO_4·7H_2O$, 0.5 gm.; tap water to make 1 liter.

The resulting inoculated medium in the flask was incubated on a rotary shaker at 25° C. for 4 to 5 days until the development of a deep green color indicated ample sporulation. The resulting conidia were stored at 5° C. until they had been ascertained to be free from contamination, and then they were used for inoculation of a seed tank for the development of vegetative inoculum.

A 750-gallon tank containing a 600-gallon charge of medium comprising the following constituents was inoculated with the resulting conidia culture and incubated until a heavy mycelial growth was obtained: brown sugar, 20 gm.; $NaNO_3$, 3 gm.; $KH_2PO_4$, 1.5 gm.; $MgSO_4·7H_2O$, 0.5 gm.; $ZnSO_4·7H_2O$, 10 mgm.; cornsteep liquor, 30 ml.; $CaCO_3$, 10 gm.; tap water to make 1 liter. Ten liters of soybean oil were added to each 600 gallons of medium. Throughout the incubation period aerated conditions were maintained with a propeller-type agitator and a continuous flow of air through the medium.

Direct transfer of the resulting vegetative inoculum from the vegtative inoculum tank was made through sterile pipe lines to 10,000-gallon fermentors, which were charged with either 6,000 or 7,500 gallons of production medium comprising lactose, 20 gm.; cornsteep liquor, 50 gm.; $CaCO_3$, 10 gm.; phenylacetamide, 2 gm.; soybean oil, 10 ml.; tap water to make 1 liter. Air-flow appropriate to the batch volumes was maintained at about 360 and about 400 cubic feet per minute, respectively, and an agitator was maintained at approximately 100 R. P. M. Octadecanolin mineral oil was added as needed to prevent frothing, and each batch was incubated at 24° C. until the maximum penicillin titre developed.

For purposes of a thorough comparison, one month was devoted to such large-scale fermentations with the new variety, and the results were compared wtih those of a month's fermentations with the parent on the same scale. The penicillin was isolated, purified, and chemically and clinically evaluated. The amount of isolated penicillin resulting from thirteen batches so fermented with the new variety was fifteen billion units greater than the amount isolated from sixteen batches fermented with the parent.

Monosaccharides and/or disaccharides other than those named in the examples may be used in these processes.

The examples herein are given by way of illustration and not of limitation, as it is obvious that certain modifications may be made in the compositions of the media and in the steps of the fermentation processes, and in the kinds and proportions of the materials employed, without departing from the spirit and scope of the invention and the purview of the claims.

I claim:

1. Process for the production of penicillin, comprising fermenting an aqueous nutrient medium under submerged aerated conditions by means of the fungus *Penicillium chrysogenum* var. *brevisterigma*.

2. Process for the production of penicillin, comprising inoculating a nutrient carbohydrate-containing aqueous medium with *Penicillium chrysogenum* var. *brevisterigma*, allowing fermentation to proceed under submerged aerated conditions, and recovering said product.

3. Process for the production of penicillin by subjecting an aqueous medium containing carbohydrate and other nutrient substances to the action of *Penicillium chrysogenum* var. *brevisterigma*, the process being conducted at about 24° C. while the said medium is agitated and aerated throughout.

4. Process for producing penicillin, comprising the fermentation, under submerged aerated conditions, by *Penicillium chrysogenum* var. *brevisterigma*, of an aqueous medium comprising cornsteep liquor solids, lactose, calcium carbonate, phenylacetylethanolamine and soybean oil.

5. Process for producing penicillin, comprising forming an aqueous medium containing lactose, calcium carbonate, cottonseed meal, phenylacetylethanolamine, and soybean oil, supplying thereto the fungus *Penicillium chrysogenum* var. *brevisterigma*, and conducting fermentation under submerged aerated conditions.

6. Process for the production of penicillin which comprises inoculating with the fungus *Penicillium chrysogenum* var. *brevisterigma* an aqueous medium comprising lactose, glucose, starch, acetic acid, ammonium nitrate, ammonium nitrate, ammonium sulfate, potassium nitrate, dibasic sodium phosphate, tribasic potassium phosphate, magnesium sulfate, zinc sulfate, copper sulfate, ferrous sulfate, potassium dichromate, and soybean oil, and then conducting fermentation under submerged aerated conditions.

7. Process for the production of penicillin, comprising the fermentation of an aqueous medium containing cornsteep liquor solids, lactose, calcium carbonate, and soybean oil, by means of *Penicillium chrysogenum* var. *brevisterigma*, under submerged aerated conditions.

8. Process for producing penicillin, comprising the fermentation of an aqueous medium containing cornsteep liquor solids, sucrose, calcium carbonate, phenylacetylethanolamine, and soybean oil, by means of *Penicillium chrysogenum* var. *brevisterigma*, under submerged aerated conditions.

9. Process for the production of penicillin, comprising fermenting an aqueous nutrient medium, containing a member selected from the group consisting of phenylacetylethanolamine and phenylacetamide, by means of the fungus *Penicillium chrysogenum* var. *brevisterigma*, under submerged aerated conditions.

10. In a process for the production of penicillin which comprises fermenting aqueous nutrient media by means of the fungus *Penicillium chrysogenum* var. *brevisterigma*, the steps comprising inoculating with the conidia of the said fungus an aqueous medium containing brown sugar, sodium nitrate, monobasic potassium phosphate, magnesium sulfate, zinc sulfate, cornsteep liquor, calcium carbonate and soybean oil, incubating the resulting inoculated medium, under submerged aerated conditions, permitting the development of a mycelial inoculum of the said fungus, mixing the resulting inoculum with an aqueous medium containing lactose, cornsteep liquor, calcium carbonate, phenylacetamide, and soybean oil, conducting the fermentation of the resulting mixture, under submerged aerated conditions, and extracting the penicillin from the resulting fermentation broth.

JACKSON WALTER FOSTER.

No references cited.

Certificate of Correction

Patent No. 2,458,495. January 11, 1949.

JACKSON WALTER FOSTER

It is hereby certified that errors appear in the printed specification of the above numbered patent requiring correction as follows:

Column 1, line 50, for "crysogenum" read *chrysogenum*; column 2, line 43, for "eithe" read *either*; columns 5 and 6, in the lower middle box of the tabulation, line 3, for "contral" read *central*; column 9, line 37, Table 5, for "SACCAROGENIC" read *SACCHAROGENIC*; same line, for "(pH-" read $(pH_7-$; column 12, line 31, for "assasys" read *assays*; column 13, line 30, for "vegtative" read *vegetative*; column 14, line 27, claim 6, after the word and comma "acid," strike out "ammonium nitrate,";

and that the said Letters Patent should be read with these corrections therein that the same may conform to the record of the case in the Patent Office.

Signed and sealed this 7th day of June, A. D. 1949.

[SEAL]

THOMAS F. MURPHY,
*Assistant Commissioner of Patents.*